INVENTOR.
EDWARD C. DAWSON
BY Harry A. Herbert Jr. and
Julian L. Siegel
ATTORNEYS

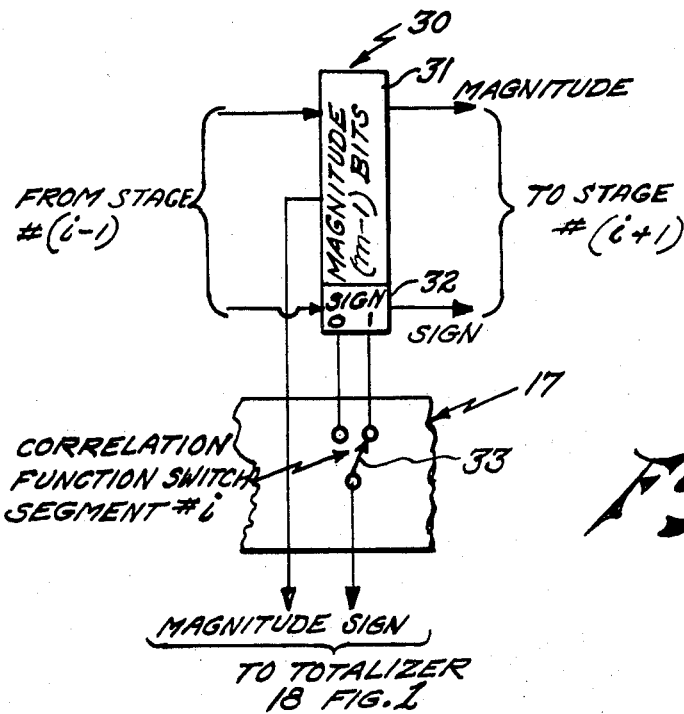
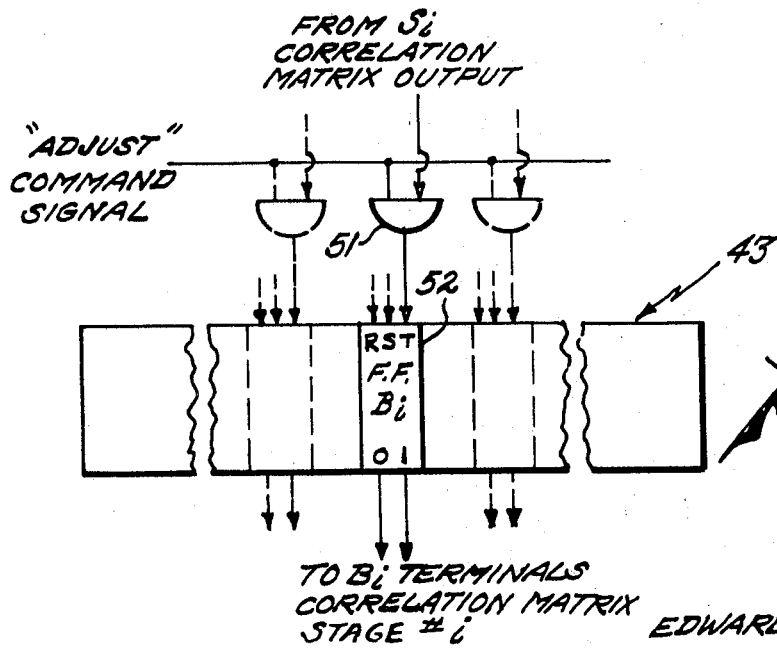

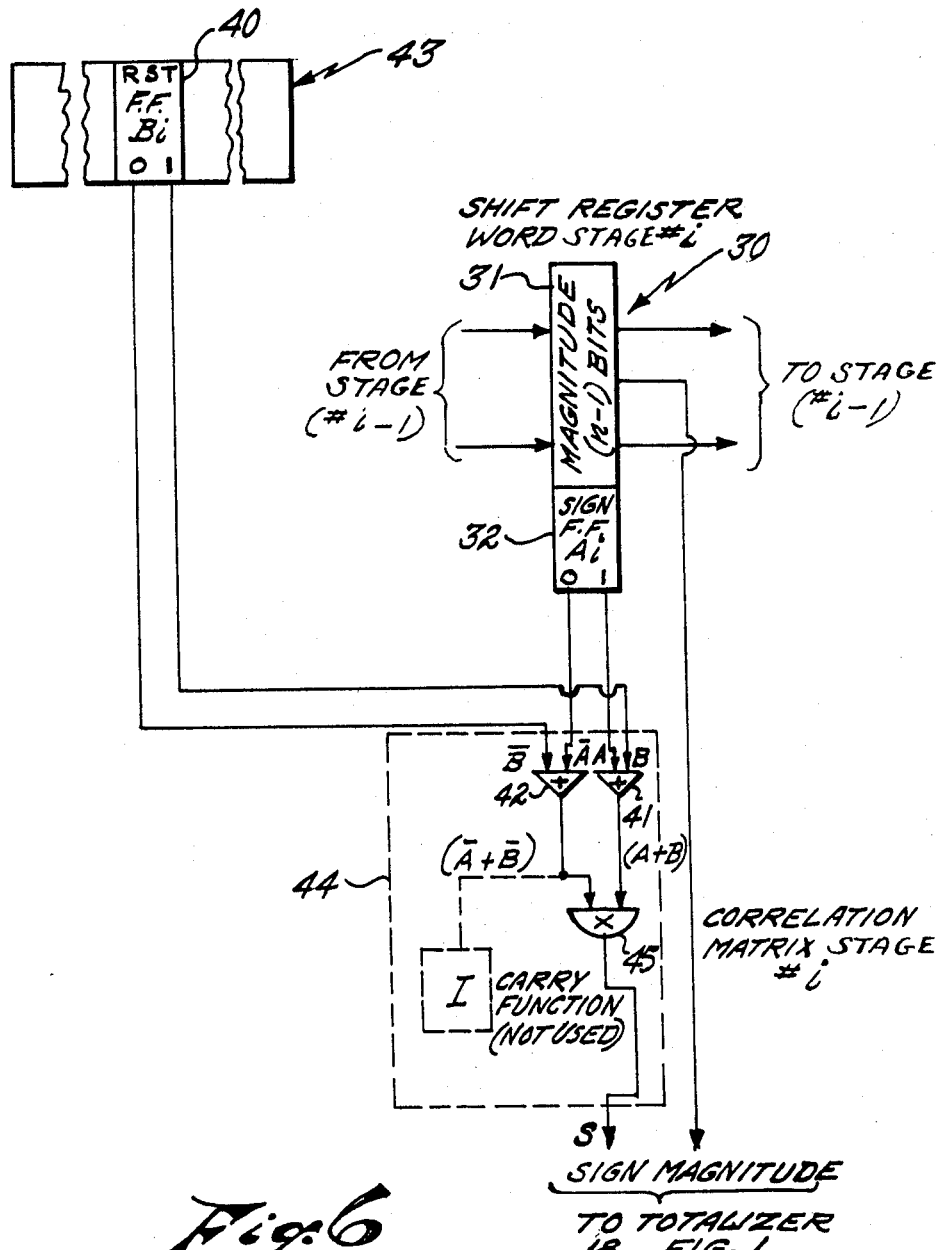

United States Patent Office 3,431,405
Patented Mar. 4, 1969

3,431,405
SPECTRUM ANALYZER
Edward C. Dawson, Saratoga, Calif., assignor to the United States of America as represented by the Secretary of the Air Force
Filed Feb. 16, 1965, Ser. No. 433,238
U.S. Cl. 235—150.5     4 Claims
Int. Cl. G06j 1/00; G06g 7/12; G06f 15/34

ABSTRACT OF THE DISCLOSURE

Apparatus for determining frequency of an unknown signal that mixes with an oscillator varying linearly in frequency. The mixed signal is fed to an intermediate frequency bandpass amplifier followed by an analog-to-digital converter that samples the output of the bandpass amplifier and then a digital shift register receives the output of the converter. A correlation matrix or switch array reverses the sign of negative values in the shift register and a totalizer sums the register's contents.

---

This invention relates to spectrum analyzers and more particularly to spectrum analyzers using a correlation technique.

The invention represents a solution to the problem in attempting to ascertain energy spectral distribution under conditions requiring high sensitivity, sharp resolution, and where the spectral distribution is subject to change at high rates.

There are two general approaches to determine the spectral distribution of energy. The first approach may be referred to as a nontime multiplexed approach, and consists of utilizing a number of wave filters of bandwidth and quantity appropriate to the required resolution and the width of the spectrum to be investigated. If the total spectrum is large and the required resolution within that spectrum is narrow, then there are economic limitations to this approach.

Frequently, the data of change rate is such that one or more filters can be scanned in frequency to provide the desired sensing. This second general approach may be termed "frequency scanning." There are several techniques commonly employed to accomplish frequency scanning. In the conventional method a fixed tuned filter (for example, a receiver IF bandpass amplifier) is employed together with means for translating in frequency the spectrum under investigation. This translation can be accomplished, for example, by a superheterodyne receiver in which the local oscillator is caused to change in frequency.

With conventional scanning methods, if one specifies the required rate of scanning, then there is a limit with respect to resolution. This limit cannot be exceeded by reducing the steady-state bandwidth of the scanning receiver, even though one may be perfectly willing to sacrifice sensitivity for an improved resolution. When steady-state bandwidth is further reduced, the filter will continue to deliver energy sometime after the receiver has been swept through a particular signal. The apparent resolution, therefore, is degraded by this ringing effect.

A more sophisticated technique, variously referred to as frequency compression or time compression, has been used to acquire narrow frequency resolution without reducing scan rate and sensitivity. Basically, this technique consists of using a relatively broad filter followed in turn by a device which inserts a frequency dependent time delay. Under these circumstances, the response as a signal enters the IF window is delayed in time to coincide with the response produced by that same filter as the signal leaves the IF window. Under these circumstances, the total response to the signal is compressed in time, producing the equivalent of narrow resolution. This method has some practical problems. Among these problems are difficulties in reducing spurious response when discrete filters are employed; difficulties in achieving tracking between the scanning oscillator and the characteristics of the delay network, difficulties in obtaining desired characteristics for individual filters comprising a discrete filter network combination. As a consequence, often time compression cannot be advantageously employed.

The invention being disclosed herein circumvents the problems of realizing the required time-frequency characteristic by employing a correlation technique.

It is therefore an object to provide a novel spectrum analyzer having good resolution.

It is another object to provide a novel spectrum analyzer having high sensitivity.

It is still another object to provide a spectrum analyzer that can determine a spectral distribution changing at a high rate.

These and other advantages, features and objects of the invention will become more apparent from the following description taken in connection with the illustrative embodiment in the accompanying drawings wherein:

FIGURE 5 shows a section of the correlation matrix that uses manually operating switches;

FIGURE 6 shows a correlation matrix, or switching array for electronic control using half-adders; and FIGURE 7 shows a system for automatically setting the correlation matrix to match a given waveform.

Figure 1:
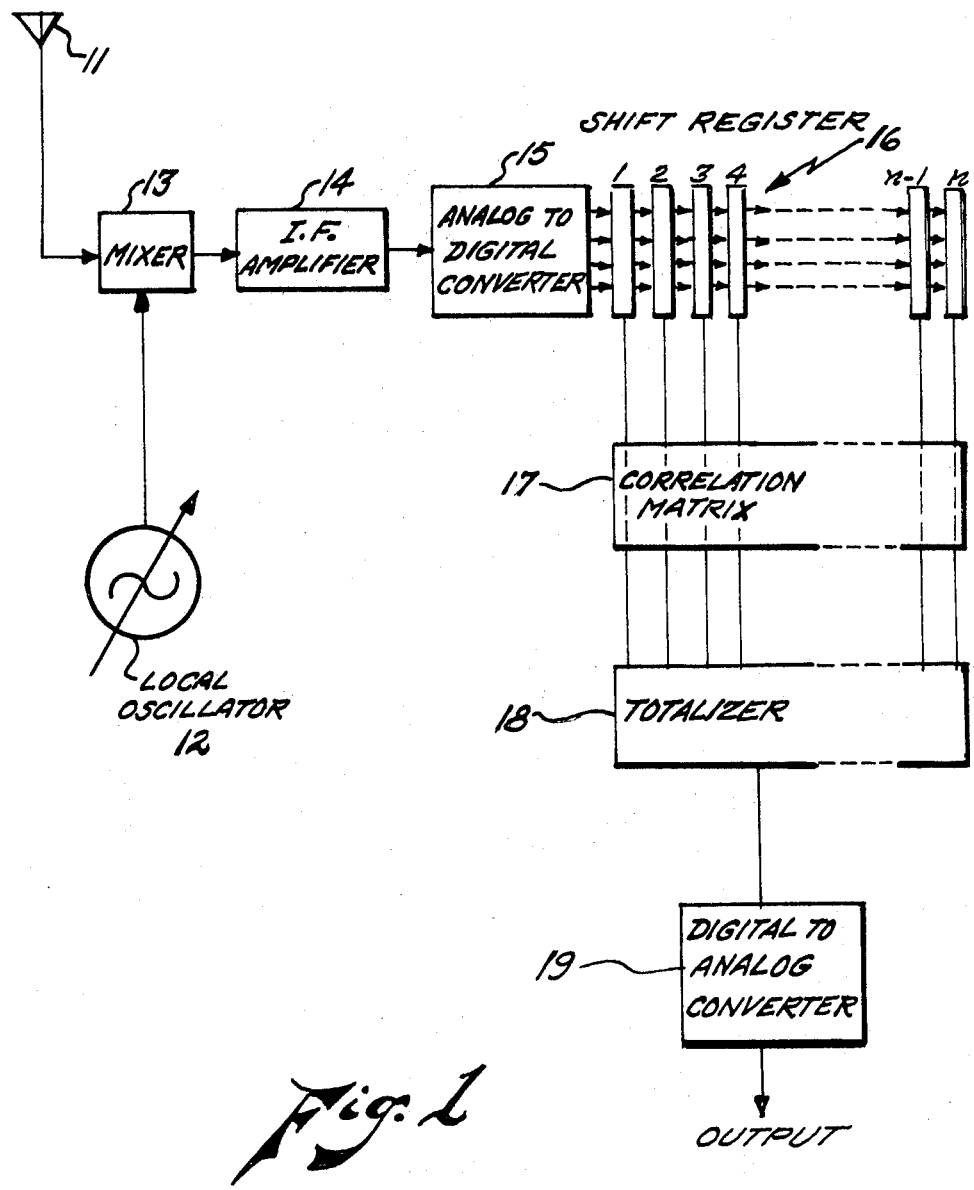
FIGURE 1 is a block diagram of the spectrum analyzer.

The correlation technique will now be described as it may be used with a scanning receiver. Referring to FIGURE 1 the incoming signals are received at antenna 11 manner. The incoming signal from antenna 11 and the output from local oscillator 12 are combined in mixer 13.

The frequency changing local oscillator 12, by the heterodyne principle, causes fixed frequency signals at antenna 11 to appear as frequency changing signals at the output of mixer 13 and IF amplifier 14. The combination of elements, analog to digital converter 15, shift register 16, correlation matrix 17, totalizer 18, and digital-to-analog converter 19 are constructed such that a maximum response is produced at the output of digital-to-analog converter 19 to signals which are changing in frequency at precisely the rate brought about by the changing frequency of oscillator 12. The desired maximum response to a changing frequency signal appearing at the output of amplifier 14 is achieved in the following way:

IF amplifier 14 output is quantized by analog-to-digital converter 15 whose conversion ratae is compatible to the highest frequency to be passed by IF amplifier 14, the desired output resolution, and signal sensitivity. The quantized representation of the output of amplifier 14 is then transferred to digital register 16. In the embodiment of the invention described, register 16 is the shifting type which is capable of storing $n$ words, each word being of $m$ bits including the sign.

Figure 4:
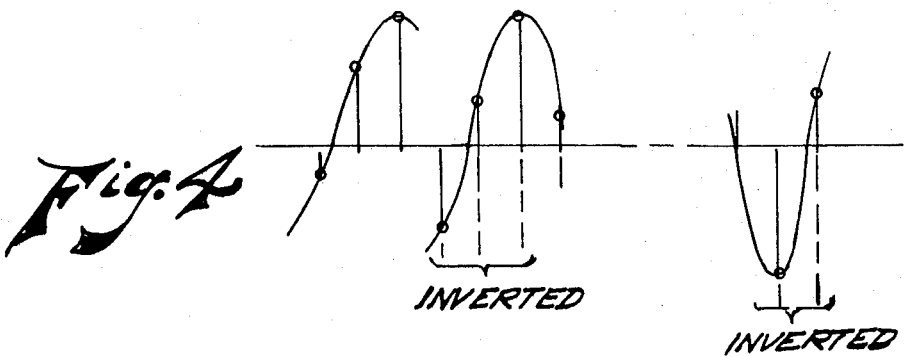
FIGURE 4 shows the relationship at the output of the correlation matrix one sampling period later than that of FIGURE 3.

The shift register can be constructed in a number of ways. For example, refer to "Arithmetic Operations in Digital Computers," by R. K. Richards, published by D. Van Nostrand Company, Inc., 1955. Page 145, FIGURE 5-4 illustrates a shift register employing flip-flops. This figure shows a 3-stage, one bit per stage shifting register. The number of stages of this register can be increased by connecting more such units in cascade. Additional bits per stage can be acquired by placing the required number of units in parallel.

With each new output from analog-to-digital converter 15, the contents of each stage of register 16 is shifted to the right, one address position. Thus, stage No. 1 of the register 16 contains a digital representation of the most recent amplitude measurement of the output of IF amplifier 14, and stage $n$ contains the oldest measurement retained. The length $n$ of register 16 is such that a sequence of measurements covering a time period approximately equal to that required for oscillator 12 to sweep the width of IF amplifier 14 is stored. The quantization of IF amplifier 14 is bipolar, that is, the algebraic sign of the amplitude is included in the digital representation contained in register 16.

Figure 2:
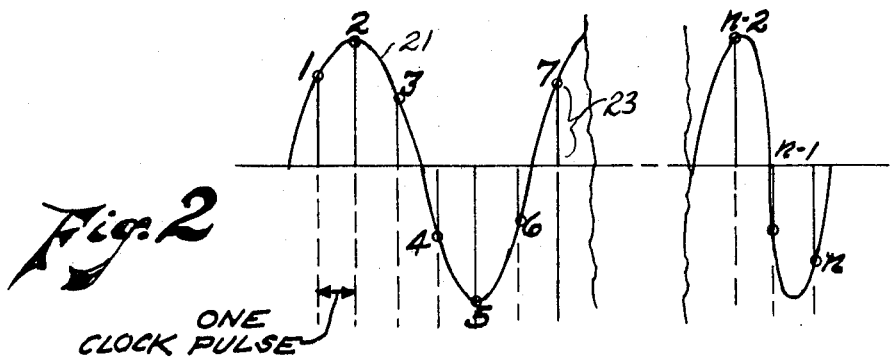
FIGURE 2 shows the relationship of a possible analog waveform and the contents of the shifting register.
Figure 3:
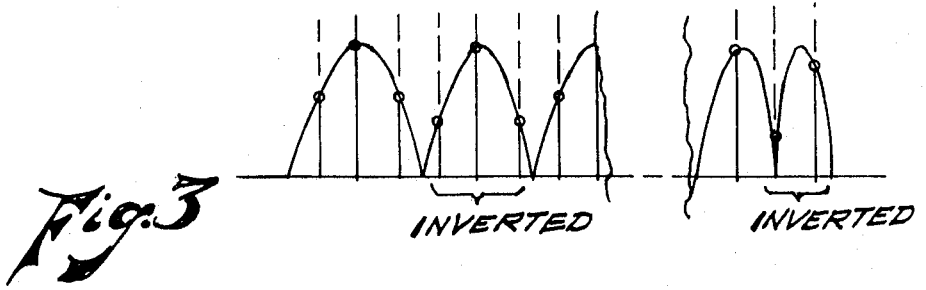
FIGURE 3 shows the corresponding relationship of the output of the correlation matrix.

In FIGURE 2 there is shown a graphical representation of the relationship of the analog waveform from amplifier 14 and the contents of register 16 immediately following in time the passing of a changing frequency signal through IF amplifier 14. Waveform 21 is the analog output of IF amplifier 14. The circled points 1, 2, 3 . . . are the sampled points which are connected by analog-to digital converter 15. As an example, the value represented by line 23 is stored in stage 7 of shift register 16. Totalizer 18 performs an algebraic summation of the total contents of register 16 after the contents have been modified upon passing through correlation matrix 17. This summation is performed at a time rate equal to that of the original waveform sampling rate. The parallel output of register 16 is modified by correlation matrix 17 such that the algebraic sum of the parallel inputs to totalizer 18 is maximized when the desired waveform is stored in register 16. This is accomplished by appropriate changes of algebraic sign of the waveform sample values stored at certain shift register stages before summation is performed by totalizer 18. It is the function of the correlation matrix 17 to make appropriate changes of sign. In the absence of correlation matrix 17, the algebraic sum of the contents of register 16 will, in general, approximate zero since the output of amplifier 14 and hence analog-to-digital converter 15 has no DC component. Thus, totalizer 18 would yield a value which fluctuated with time about a narrow region in the vicinity of zero. However, correlation matrix 17 interposed between register 16 and totalizer 18 causes the algebraic sign of certain groups of words of register 16 to be reversed insofar as the sensing by totalizer 18 is concerned. If all the quantized samples in register 16 that have negative signs were inverted, then the totalizer would yield a large output consisting of a summation of the absolute values of each of the $n$ words contained in the storage. For the particular application being described matrix 17 is so connected that an inversion takes place for those values of the waveform which we would expect to be negative for the particular waveform for which we desire correlation. In this case the desired correlation is with a quasi-sinusoid whose frequency is time changing in accordance with the frequency sweep of oscillator 12 and whose time period is likewise changing. Specifically, the waveform which correlation is desired can be represented as shown in FIGURE 2. Under these circumstances, stages 4, 5 and 6 of register 16 are reversed, whereas the sign of data words from stages 1, 2 and 3 remain unchanged as well as $n-1$ and $n$. This relationship is extended throughout the balance of matrix 17 through register stage n as shown in FIGURE 3. As a result totalizer 18 output would be very large.

For a fixed correlation function the connections of correlation matrix 17 remain unchanged. With time, the contents of register 16 shifts from left to right. The operation of register 16, correlation matrix 17, and totalizer 18 can be visualized as a situation where a quantized, time changing waveform is moved passed fixed windows represented by correlation matrix 17. Totalizer 18 continuously registers a value representative of the degree to which the waveform contained in register 16 coincides with the particular correlation function contained in correlation matrix 17. The totalizer consists of means for accomplishing algebraic additions of the digital inputs received from the correlation matrix. This can be achieved by conventional digital logical design. As an example, the situation which would be expected to occur, one sample time interval later with respect to the waveform shown in FIGURE 2, is given in FIGURE 4. If an analog output is desired, the contents of totalizer 18 can be converted by means of digital analog converter 19.

In operation of the invention, assume that a frequency band from $f_1$ to $f_2$ is to be analyzed ($f_2 > f_1$). Thus signals within this band appear at antenna 11 input terminal to mixer 13. Assume that one sinusoidal signal of frequency $f_s$ is present within this band ($f_1 < f_s < f_2$). Assume the upper and lower frequencies passed by bandpass IF amplifier 14 are $f_h$ and $f_l$ respectively. Thus the bandwidth of this amplifier is $f_h - f_l$. Further assume that the instantaneous frequency of oscillator 12 is designated $f_o$ and the oscillator is to change in frequency starting at a lower frequency $f_{ol}$ and ending at an upper frequency $f_{oh}$. Following this excursion, the oscillator is to restart at frequency $f_{ol}$, repetitively sweeping in frequency from $f_{ol}$ to $f_{oh}$. In addition, assume that the oscillator operates at frequencies lower than the signal frequencies to be examined ($f_o < f_1$), and only the difference frequencies ($f_s - f_o$) rather than sum frequencies ($f_s + f_o$) produced at the output of mixer 13 may be passed by IF amplifier 14.

With those assumptions, the lower and upper frequencies $f_{ol}$ and $f_{oh}$ of oscillator 12 may be stated in terms of the frequency limits $f_2$ and $f_1$ of the band to be examined and the frequency limits $f_l$ and $f_h$ of amplifier 14. Thus: $f_1 - f_{ol} = f_h$ and $f_2 - f_{oh} = f_l$. Therefore, $$f_{ol} + rt f_{ol} \leq (f_{ol} + rt) \leq f_{oh}.$$

The instantaneous frequency $f_o$ of oscillator 12 for a single sweep, may be expressed as $$f_o = f_{ol} + rt \text{ (for } f_{ol} \leq f_o \leq f_{oh})$$

where $r$ is the rate of frequency change (scan rate) in Hz. and $t$ is the time in seconds from the beginning of the sweep.

The frequency $f_m$ of the signal at the output of the mixer 13 as a consequence of signals of frequencies $f_s$ and $f_o$ at the mixer inputs is $$f_m = f_s - f_o = f_s - (f_{ol} + rt) = f_s - f_{ol} - rt$$

Note that $f_m$ decreases in frequency as the sweep progresses. When frequency $f_m$ diminishes to the upper frequency limit $f_h$ of IF amplifier 14, it will be passed by that amplifier and continue to be passed until $f_m$ drops below the lower frequency limit $f_l$. Thus the output of amplifier 14 is a signal of frequency $f_m$, provided $$f_l < f_m < f_h$$

During passage by amplifier 14, the signal consisted of a quasi-sinusoidal train beginning at frequency $f_h$ and ending at frequency $f_l$. Shift register 16 maintains a running storage for a digitally sampler representation of the signal train over the period of time required for a signal to change frequency from $f_h$ to $f_l$. Thus, in the case being described when $f_m = f_l$, the shift register contains a series of sample points which represent, digitally, the waveform of a quasi-sinusoid having a frequency beginning at $f_h$ and ending at $f_l$. The "oldest" sample is stored at the right end of the shift register and corresponds to frequency $f_h$.

The input(s) to totalizer 18 are the parallel readout(s) from the shifting register except certain stages of the shift register are readout with sign reversed by the correlation matrix. The particular stages which are reversed when readout to the totalizer are those stages containing negative portions of the quasi-sinusoid signal train when this train has been advanced through the register to the point where the sample representing frequency $f_h$ reaches the right end of the shifting register.

Under these circumstances, the waveform train presented to the totalizer is the same as the waveform train at the shift register except that all negative going portions have been "flipped" over.

The waveforms appearing at various points are tabulated below. Note that the term "quasi-sinusoid" is used where changing frequency is involved, since, strictly speaking, a sinusoid does not change frequency.

Signal input to mixer
  13 _____ Sinusoid of frequency $f_s$.
Oscillator input to mixer
  13 _____ Quasi-sinusoid of frequency $f_{o1}+rtf_{o1} \leq (f_{o1}+rt) \leq f_{oh}$.
Input to amplifier 14 ___ Quasi-sinusoid of frequency $f_s-f_{o1}-rt$ (where it is restricted as above).
Input to analog to digital
  converter 15 _____ Quasi-sinusoid of frequency $f_s-f_{o1}-rt$ provided $f_1 < (f_s-f_{o1}-rt) \leq f_h$.
Input to shift register 16,
  stage 1 _____ Same as input to ADC, except quantized.
Input to stage $n$ of shift
  register _____ Same as stage 1 except delayed in time $(n-1)T$ where T is clock pulse interval.

Certain practical limits exist in establishing a high degree of linearity in the rate of frequency change by an oscillator used in a sweeping mode. A change in rate of frequency shift would ordinarily result in reduced correlation if the correlation function is rigidly fixed. In some applications the desired resolution, sweep rate, and sensitivity cannot be achieved because of this limitation. The method by which correlation is performed as shown in this invention adapts itself readily to alteration of the correlation function. Correlation matrix 17 consists of means for passing the algebraic sign either unchanged or inverted to totalizer 18. A change in correlation function is accomplished by the switching in or out of digital inverters or connection to bipolar devices which can be done rapidly by conventional switching techniques. A conventional switching technique is illustrated in FIGURE 6. In this case, switching logic equivalent to the use of one output of a half-adder is employed to select the connection to be made to a bipolar device. as shown, the bipolar device consists of a flip-flop with accessibility to both the zero and the one output terminals. For those applications where it is not practical to achieve the required frequency linearity, there are situations where a satisfactory degree of repeatability between successive scans can be achieved. Under these conditions, correlation matrix 17 can be electronically switched throughout a single scan period to match the instantaneous sweep rate of a particular segment of the scan. The means for this electronic switching is explained subsequently.

The invention being described is a frequency scanning spectrum analyzer. A frequency changing local oscillator causes incoming fixed frequency signals to become frequency changing signals at the output of mixer 13 and IF amplifier 14. Frequency changing signals are converted to a digital form by the analog digital converter 15 and advanced through the shift register 16. A signal appearing at the input of mixer 13 after being so converted will at some time during the frequency sweep match the correlation matrix as it is advanced through the shift register. When this matching condition occurs, a large increase in the output of totalizer 18 occurs. The combination of elements 15, 16, 17, 18, and 19 can be regarded as an analog filter which resonates to a signal which changes frequency in a precise way, whereas conventional analog filters are resonant to signals having fixed frequencies. An incoming fixed frequency signal is converted to a frequency changing signal of the required frequency change rate by the local oscillator. The subsequent elements of the spectrum analyzer are made maximally responsive to this frequency changing characteristic.

A spectrum analyzer in conventional form would consist of the elements 11, 12, 13, and 14. However, to achieve the same frequency resolution, IF amplifier 14 must contain a sharply resonant filter, whereas in the spectrum analyzer disclosed, this amplifier has a wideband pass. In both cases the local oscillator is changing frequency and thus the time required to scan a given frequency band is governed by the bandpass characteristics of the IF amplifier, since time must be allowed for the resonant elements therein to respond to a signal occurring at near the resonant frequency. If the IF amplifier band width is B Hz., then the response time of the filter is approximately $1/B$ seconds. This corresponds to a maximum scan rate of $B^2$ Hz. Thus in the conventional case, if a frequency resolution of 100 Hz. is required, then the maximum possible scan rate is $100^2$ or 10 kHz. In this case, the IF amplifier contains a filter having a bandwith of 100 Hz. (actually slightly less than this).

In the spectrum analyzer being disclosed, the bandwidth of the IF amplifier may be much wider than the resolution to be achieved. This is because the configuration which follows the IF amplifier is responsive to signals which are *changing* in frequency rather than being tuned to a fixed frequency. Comparing with the previous example, we can set the IF bandwidth at 10 kHz. or more and yet achieve 100 cycle resolution. If the bandpass is set at 10 kHz. and 100 cycle resolution is required, then the local oscillator scan rate can be increased such that it scans 10 kHz. in a time equal to approximately $1/R$ seconds where R is the required resolution (in this case 100 cycles). A 10 kHz. frequency excursion in $\frac{1}{100}$ of a second corresponds to a scan rate of 1 mHz. per second. Thus by the technique indicated, a much higher scan rate for a given resolution can be achieved than that by a conventional means.

In even more restricted applications, satisfactory long-term repeatability cannot be achieved. Under these conditions, the configuration described can be adapted to automatically readjust the correlation matrix for an optimum correlation. As an example of this mode of operation, at periodic intervals the antenna of the scanning receiver could be disconnected and switched to a source of known fixed frequency signals. The number of known fixed signals is made equal to the number of straight line approximations desired or required of the oscillator frequency change function. When the first pilot signal is encountered, and this signal has been shifted into the $n$ stages of the register, the shift function of the register can be temporarily discontinued (automatically by closing the shift pulse gate). This would be followed by sequential switching of successive matrix connections, while the totalizer output is sensed. The switching of the matrix is thus adjusted on a trial and error basis for maximum totalizer output. The particular connections which resulted in maximum output are then shifted to a secondary digital storage for subsequent use in successive scan periods for that particular segment of the scan. When the first compensating function has been found, the shifting of the register is then reestablished and continued until the second pilot signal is encountered, etc.

A troublesome feature of time compression techniques employing discrete filters is that of spurious sidelobe responses. A practical consequence of this spurious response is that these spurious responses may be mistaken for real signals. This problem can be circumvented in the proposed scheme by taking advantgae of the fact that with main lobe response, all quantized values contained in the register, when viewed from the output side of the correlation matrix, appear to, in general, have the same algebraic sign with opposite signs distributed randomly, depending on noise, etc. throughout the input terminals of the totalizer. With nonmain lobe responses, however, there is a periodic alteration of algebraic signs. This characteristic can be sensed and used to either negate the subsequent totalizer output, or if necessary, a secondary function can be established which will, in essence, predict spurious responses resulting from main lobe responses of specified amplitudes. This prediction can be used to compensate the totalizer output. Under these circumstances, signals which might otherwise be hidden by spurious outputs of a strong signal and negated if the first mode of operation is employed, would appear in the totalizer output under the second proposed mode of operation.

Another alteration of the correlation matrix adapts itself to applications wherein automatic recognition of certain signal types is desired. With various types of modulation, certain characteristic features of the spectral distribution of energy exist. Under these circumstances, if the resolution and scan rate of the receiver are adjusted appropriately, then these characteristics will appear in the register after such a signal has been encountered. If the correlation matrix has been adjusted to correlate with this particular spectral characteristic, then a high output will be recorded by the totalizer, whereas other signal types will produce a lesser output.

The technique described can be made self-adaptive if desired. Under these circumstances, the shifting of the register contents from left to right is halted at various times (either specified or randomly selected), and a sequential switching of the correlation matrix performed while the totalizer output is sensed. The matrix is adjusted until a maximum value is obtained from the totalizer. The resulting status of the correlation matrix represents an optimum correlation function for the particular signal encountered even though its characteristics may not have been previously known. This correlation function can be transferred to memory or retained within the matrix depending upon the particular application.

The correlation matrix can consist of a group of single pole-double throw (SPDT) switches. One switch is employed for each shift register word or stage. Thus, $n$ switches comprise the correlation matrix. Each switch connecting to an associated sign bit flip-flop of the $n$ word shift register.

FIGURE 5 shows stage 30 of shift register 16 and SPDT switch 33 of correlation matrix 17. The contents of stage 30 is made up of magnitude portion 31 and sign bit flip-flop 32. Accordingly, the algebraic sign of the signal sample as viewed from the output side of correlation matrix 17 is either retained or inverted depending upon the position of switch 33. The positions of the $n$ switches are set to coincide with the particular desired frequency time function.

For applications involving rapid and/or automatic readjustment including adaptive readjustment or correlation matrix 17 a construction using half-adders may be employed. Description of such devices are contained in most logical or digital circuit design books; such as A. I. Pressman, "Design of Transistorized Circuits for Digital Computers," J. F. Ryder Publishers, Inc., New York, 1959, page 2–23.

Correlation matrix 17 using one of the half-adders 44 is shown in FIGURE 6. Sign flip-flop 32 is one input pair designated A and $\overline{A}$ to OR gates 41 and 42 of half-adder 44. The other input pair designated B and $\overline{B}$ is provided by flip-flop 40 of additional register 43 which is the correlation function storage register which in effect stores the desired switch position. Both outputs of OR gates 41 and 42 are fed to AND gate 45. The half-adder sum is the sign output to totalizer 18. For purposes of explanation sign flip-flop 32 has $A=1$ and $\overline{A}=0$ which indicates that the associated quantity in shift register stage 30 has a positive sign. Correlation function flip-flop 40 has $B=1$ and $\overline{B}=0$ which indicates that the sign of the quantity from shift register cell 31 is to be inverted before totalizing. When $S=1$ totalizer 18 is to regard the algebraic sign of the associated quantity as positive. The half-adder configuration functions as a single-pole double throw switch just as before. However, the effected position of this switch is established by the state of the associated flip-flop 40 which is a portion of correlation function storage register 43. The states of $n$ flip-flops in storage register 43 are set to correspond with the particular frequency-time function for which high output from the totalizer 18 is desired. Changes in correlation functions are accomplished by corresponding change orders to flip-flops 40 in the correlation function storage register 43.

FIGURE 7 shows a method by which the correlation function can be set automatically to fit a waveform contained in shift register 16. The basis of this technique is the fact that when a waveform in shift register 16 matches correlation matrix 17 all sign outputs of the matrix are the same. Therefore, if a match is desired for any arbitrary waveform contained in shift register 16 the outputs of correlation matrix 17 can be used to activate correlation function storage register 43 to correct any sign inequality. This accomplished, correlation martix 17 will now match any subsequent reappearance of that same waveform.

Feedback from each sign output terminal of correlation matrix 17 is connected to associated flip-flop 52 of correlation function storage register 43. Flip-flop 52 is the reset-set-trigger (R–S–T) type. A pule on the "T" terminal of a R–S–T flip-flop causes to reverse its existing state. One of the many references to these devices is M. Phister, Jr., "Logical Design of Digital Computers," John Wiley & Sons, Inc., New York, 1958, page 129.

Feedback is made through AND gate 51 with adjust command signal bus 50 which is activated when a match setting is desired. In the configuration shown all flip-flops of correlation function storage register 43 are flipped to those states which produce all negative signs at the output of correlation matrix 17 for the specific waveforms in shift register 16. This set of states then corresponds to the appropriate setting of correlation matrix 17 for that signal.

What I claim is:

1. An apparatus for determining spectral distribution of an unknown signal comprising:
   (a) means for receiving the unknown signal;
   (b) an oscillator for generating a signal that linearly varies in frequency between predetermined limits;
   (c) means for mixing the oscillator signal with the unknown signal;
   (d) an intermediate frequency bandpass amplifier fed by output of the mixer;
   (e) an analog-to-digital converter for quantizing the output of the intermediate frequency amplifier;
   (f) a digital shift register having a magnitude section and an algebraic sign bit for recording the quantized output of the analog-to-digital converter;
   (g) means for reversing the sign of negative values in the shift register, the reversing means comprising a correlation matrix fed by the bits of the shift register;
   (h) and totalizer fed by the correlation matrix and the magnitude section of the shift register for summing the contents of the register.

2. An apparatus for determining spectral distribution according to claim 1 which further comprises a digital-to-analog converter fed by the output of the totoalizer.

3. An apparatus for determining spectral distribution of an unknown signal according to claim 1 wherein the correlation matrix includes a group of single pole-double throw switches with one switch for each word of the shift register, the switch connecting the totalizer to the sign bit of the shift register.

4. An apparatus for determining spectral distribution of an unknown signal according to claim 1 wherein the correlation matrix includes:
(a) a group of half-adders in parallel arrangement with respect to each other for switching, with one half-adder connected to the sign bit of each word of the shift register;
(b) and a storage register fed to the half-adders for establishing the state thereof.

References Cited

UNITED STATES PATENTS

| | | | |
|---|---|---|---|
| 3,036,775 | 5/1962 | McDermid et al. | 235—165 |
| 3,090,044 | 5/1963 | Wilmotte | 324—77 XR |
| 3,145,293 | 8/1964 | Homan | 235—175 XR |
| 3,167,738 | 1/1965 | Westerfield | 340—3 |
| 3,188,453 | 6/1965 | Schneider | 235—175 |
| 3,226,534 | 12/1965 | Fitzgerald | 235—181 |
| 3,303,335 | 2/1967 | Pryor | 235—181 |
| 3,333,091 | 7/1967 | Masak | 235—181 |
| 2,923,475 | 2/1960 | Ketchledge | 235—175 |

MARTIN P. HARTMAN, *Primary Examiner.*

U.S. Cl. X.R.

324—77; 340—146; 328—159; 307—216; 235—181